United States Patent [19]

Mori et al.

[11] Patent Number: 5,525,419
[45] Date of Patent: Jun. 11, 1996

[54] MAGNETIC RECORDING MEDIUM

[75] Inventors: Takao Mori; Kazunobu Chiba, both of Miyagi, Japan

[73] Assignee: Sony Corporation, Tokyo, Japan

[21] Appl. No.: 494,225

[22] Filed: Jun. 23, 1995

[30] Foreign Application Priority Data

Jun. 30, 1994 [JP] Japan .................................. 6-150134

[51] Int. Cl.$^6$ ........................................................ G11B 5/00
[52] U.S. Cl. .......................... 428/323; 428/336; 428/409; 428/694 TB; 428/900
[58] Field of Search ..................... 428/323, 336, 428/409, 649 TB, 900

[56] References Cited

U.S. PATENT DOCUMENTS

| | | | |
|---|---|---|---|
| 4,310,599 | 1/1992 | Akashi et al. | 428/413 |
| 4,618,535 | 10/1986 | Nishimatsu et al. | 428/325 |
| 4,629,646 | 12/1986 | Ide et al. | 428/143 |
| 4,741,954 | 5/1988 | Ide et al. | 428/323 |
| 4,778,707 | 10/1988 | Arioka et al. | 428/141 |
| 4,950,535 | 8/1990 | Arioka et al. | 428/536 |
| 5,188,891 | 2/1993 | Takeda et al. | 428/323 |

*Primary Examiner*—Stevan A. Resan
*Attorney, Agent, or Firm*—Hill, Steadman & Simpson

[57] ABSTRACT

A magnetic recording medium comprising a non-magnetic support, a magnetic metal thin film formed on one surface of the non-magnetic support and a back coating layer formed on the opposite surface of the non-magnetic support. The back coating layer is composed of non-magnetic pigment powders containing carbon powders and a binder, and the content of the carbon powders based on the total weight of the non-magnetic pigment powders is not less than 20 wt %. The weight ratio of the non-magnetic pigment powders to the binder is 0.5 to 2, while the coating thickness of the back coating layer is not less than 0.2 µm. The surface resistivity of both the magnetic metal layer and the back coating layer is not higher than $10^6$ Ω/sq. The stable running performance may be achieved even if the thickness of the back coating layer is reduced, if within a range of 0.2 µm or higher. In this manner, the tape cassette may be reduced in size and the quantity of the storable information may be increased to contribute to reduction in size of the magnetic recording/reproducing apparatus.

1 Claim, 3 Drawing Sheets

MAGNETIC RECORDING MEDIUM

BACKGROUND OF THE INVENTION

This invention relates to a magnetic recording medium conveniently employed as a magnetic tape for recording/reproduction of short wavelength signals, such as a magnetic tape for a so-called high-band 8 mm magnetic video tape or a magnetic tape for a digital video tape recorder (VTR).

Up to now, a coated magnetic recording medium, in which a magnetic paint is coated on a non-magnetic support and dried to form a magnetic layer, has been widely employed as a magnetic recording medium. The magnetic paint is comprised of a powdered magnetic material, such as magnetic powders of oxides or alloys, dispersed in an organic binder, such as a vinyl chloride- vinyl acetate copolymer, polyester resin, urethane resin or a polyurethane resin.

On the other hand, in keeping up with the demand for high-density magnetic recording, a so-called magnetic metal thin film type magnetic recording medium, in which a magnetic layer is formed by directly depositing a magnetic metal material, such as a Co-Ni alloy, a Co-Cr alloy or Co-O, on a non-magnetic support, such as a polyester film, polyamide film or a polyimide film, by plating or a vacuum thin film forming technique, such as vacuum deposition, sputtering or ion plating, has been proposed, and is attracting attention.

The magnetic metal thin film type magnetic recording medium has a number of merits. That is, such recording medium is not only superior in coercivity, but also may have an extremely small thickness of the magnetic layer thus resulting in extremely low thickness loss during playback or recording demagnetization. In addition, there is no necessity of mixing a binder, a non-magnetic material, into the magnetic layer, resulting in the increased packing density of the magnetic material.

Above all, an obliquely deposited magnetic recording medium, in which the magnetic metal material is vapor-deposited in an oblique direction, is being put to practical utilization, since it is superior in electro-magnetic conversion characteristics and capable of producing a larger output.

These recording media may be in the shape of a disc or a tape depending on the type of the recording/reproducing apparatus employed. If the recording medium is tape-shaped, a back coating layer formed of non-magnetic pigment powders and a binder is usually provided on the surface of the non-magnetic support opposite to the tape surface carrying the magnetic metal thin film for improving sliding properties relative to sliding members, such as guide pins, as well as for assuring good running properties.

In the field of magnetic recording, the tendency is towards a small size of the recording/reproducing apparatus, and towards the reduction in size of a tape cassette as a recording medium. In keeping up with such tendency, there is also a demand for increasing the amount of the information that can be stored in a tape cassette. For meeting these demands simultaneously, it is necessary that a magnetic tape as long as possible in length be accommodated in a small size cassette.

Thus, in order to reduce the volume taken up by a tape roll in a tape cassette, a magnetic tape with a further reduced thickness is desired. With the conventional magnetic tape, although the magnetic layer may be significantly reduced in thickness by employing a magnetic metal thin film, the back coating layer on the opposite side thereof is still thick, so that there is ample room for improvement.

However, if the back coating layer is to be reduced in thickness, with its composition remaining unchanged, the surface resistance is increased, while jitter or electrical discharge during tape running is induced, thus interfering with stable tape running performance.

SUMMARY OF THE INVENTION

In view of the foregoing, it is a principal object of he present invention to provide a magnetic recording medium in which a stable running performance may are assured even although the back coating layer is reduced in thickness.

According to the present invention, there is provided a magnetic recording medium having a non-magnetic support, a magnetic metal thin film formed on one surface of the non-magnetic support and a back coating layer formed on the opposite surface of the non-magnetic support. The back coating layer is composed of non-magnetic pigment, powders containing carbon powders and a binder, and the content of the carbon powders based on the total weight of the non-magnetic pigment powders is not less than 20 wt %, while the weight ratio of the non-magnetic pigment powders to the binder is 0.5 to 2. On the other hand, the coating thickness of the back coating layer is not less than 0.2 μm and surface resistivity of both the magnetic metal layer and the back coating layer is not higher than $10^6$ Ω/sq.

The magnetic recording medium according to the present invention is a magnetic metal thin film type magnetic recording medium in which a magnetic metal thin film and a back coating layer are formed on one surface and on the opposite surface of a non-magnetic recording medium, respectively.

The back coating layer is mainly composed of the non-magnetic pigment powders and the binder and is provided for improving sliding properties with respect to a sliding member, such as a guide pin, and for assuring a good running performance of the recording medium.

According to the present invention, the composition of the back coating layer is optimized for improving the performance within a thin thickness range of the back coating layer. That is, the non-magnetic pigment powders containing 20 wt % or more of carbon powders are employed, and the weight ratio of the non-magnetic pigment powders to the binder (P/B ratio) is controlled to be 0.5 to 2.

The carbon powders are contained in the non-magnetic pigment powders for lowering surface resistivity of the back coating layer by electrical conductivity of the carbon powders. By having 20 wt % or more of the carbon powders contained in the non-magnetic pigment powders, the surface resistivity of the back coating layer is $10^6$ ohm/sq or less, and preferably $5 \times 10^4$ to $10^6$ ohm/sq, thus suppressing electrification on sliding tape contact with the sliding member and suppressing deterioration in tape running due to electrical charges.

If the content of the carbon powders in the non-magnetic pigment powders is lower than 20 wt %, or if the weight ratio of the non-magnetic pigment powders to the binder (P/B ratio) is less than 0.5, the surface resistivity of the recording medium exceeds $10^6$/sq in the thin back coating layer thickness range, thus deteriorating the running performance.

If the P/B ratio exceeds 2, the non-magnetic pigment powders become insufficient in adhesive properties, because of the excessively small quantity of the binder, thus resulting in the powder debris from the back coating layer.

If the back coating layer is of the above composition, the good running performance may be achieved even although the back coating layer is reduced in thickness. In such case, however, the lower limit of the back coating layer needs to be 0.2 μm. If the back coating layer has a thickness of less than 0.2 μm, a sufficient effect of the carbon particles in inhibiting electrification by the carbon particles, cannot be produced thus deteriorating the running performance. Also, in view of reduction in thickness of the recording medium, the upper limit of the back coating layer is 1.0 μm.

There is no particular limitation to the non-magnetic pigment powders employed in conjunction with the binder and the carbon powders constituting the back coating layer, such that any of those non-magnetic pigment powders commonly employed with this type of the recording medium may be employed.

The non-magnetic pigment powders may be enumerated by hematite, mica, silica gel, magnesium oxide, zinc sulfide, tungsten carbide, boron nitride, starch, zinc oxide, kaolin, talc, clay, lead sulfate, barium carbonate, barium carbonate, calcium carbonate, magnesium carbonate, boemite ($\gamma$-$Al_2O_3 \cdot H_2O$), alumina, tungsten sulfide, titanium oxide, powders of polytetrafluoro ethylene, powders of polyethylene, powders of polyvinyl chloride and meal powders.

The binder may be enumerated by a vinyl chloride- vinyl acetate copolymer, a vinyl chloride- vinyl acetate- vinyl alcohol copolymer, a vinyl chloride- vinyl acetate- maleic acid copolymer, a vinyl chloride- vinylidene chloride copolymer, a vinyl chloride- acrylonitrile copolymer, an acrylic acid ester- acrylonitrile copolymer, an acrylic acid ester- vinylidene chloride copolymer, a mathacrylic acid ester- styrene copolymer, a thermoplastic polyurethane resin, a phenoxy resin, polyvinyl fluoride, vinylidene chloride- acrylonitrile copolymer, a butadiene- acrylonitrile copolymer, butadiene- acrylonitrile- methacrylic acid copolymer, polyvinyl butyral, a cellulose derivative, a styrene- butadiene copolymer, a polyester resin, a phenol resin, an epoxy resin, a thermosetting polyurethane resin, urea resin, a melamine resin, an alkyd resin, and a urea-formaldehyde resin, alone or in combination. Of these, the polyurethane resin, polyester resin and the acrylonitrile- butadiene copolymer are most preferred because these are said to impart pliability to the product.

Meanwhile, suitable polar groups may be introduced into these binders for improving dispersibility of the non-magnetic pigment powders, or an isocyanate compound as a cross-linking agent may be employed for forming a cross-linked structure for thereby improving the durability of the product.

As the cross-linking agent, a compound produced by adding 2, 4- tolylene diisocyanate (TDI marketed under the trade name of "coronate L-50") to trimethylol propane is used most extensively. However, a compound produced by adding 4, 4-diphenylmethane diiscyanate (MDI) or hexane diisocyanate (HDI) to trimethylol propane may also be employed.

The back coating layer may be formed by dispersing carbon powders, non-magnetic pigment powders other than carbon powders and the binder in a solvent and kneading the resulting dispersion to form a back coating paint which then is applied on the non-magnetic support and dried.

The solvent for preparing the paint may be enumerated by ketone solvents, such as acetone, methylethylketone, methyl isobutyl ketone or cyclohexane, ester solvents, such as methyl acetate, ethyl acetate, butyl acetate, ethyl lactate or acetic acid glycol monoethyl ester, glycol ether solvents, such as glycol dimethyl ether, glycol monoethyl ether or dioxane, aromatic hydrocarbon solvents, such as benzene, toluene or xylene, and solvents based on organic chlorine compounds, such as methylene chloride, ethylene chloride, carbon tetrachloride, chloroform, ethylene chlorohydrin or dichlorobenzene.

While the composition and thickness of the back coating layer are controlled in this manner with the magnetic recording medium of the present invention, the magnetic metal thin film, formed on the opposite surface of the non-magnetic recording medium with respect to the back coating layer, may be of the usual composition.

The materials of the magnetic metal thin film may be enumerated by magnetic metals, such as Fe, Co or Ni, and magnetic metal alloys, such as Fe-Co, Co-Ni, Fe-Co-Ni, Fe-Cu, Co-Cu, Co-Au, Co-Pt, Mn-Bi, Mn-Al, Fe-Cr, Co-Cr, Ni-Cr, Fe-Co-Cr, Co-Ni-Cr or Fe-Co-Ni-Cr. The magnetic metal thin films may be formed of one or more of layers of these materials. An oxide layer may be provided in the vicinity of the magnetic metal film surface for improving corrosion resistance. An underlying layer may also be provided between the magnetic metal thin film and the non-magnetic support. In case of a multi-layer magnetic metal thin film, an intermediate layer may be provided between neighboring magnetic metal thin films for improving the adhesion and controlling the coercivity.

The magnetic metal thin film forming techniques include so-called PVD techniques, such as a vacuum vapor deposition method of evaporating the magnetic metal materials by heating under vacuum for deposition, an ion plating method of evaporating the magnetic metal material during electrical discharge, and a sputtering method of producing glow discharge in an atmosphere mainly composed of argon and ejecting atoms out of the target surface with produced argon ions.

The non-magnetic support may be enumerated by polyesters, such as polyethylene terephthalate, polyolefins, such as polyethylene or polypropylene, cellulose derivatives, such as cellulose triacetate, cellulose diacetate or cellulose butyrate, vinyl resins, such as polyvinyl chloride or polyvinylidene chloride and plastics, such as polycarbonate, polyimide or polyamide imide.

The surface of the non-magnetic support on which the magnetic metal thin film is formed may be formed with plural micro-sized surface protrusions for controlling surface characteristics of the recording medium by a laminar operation. These surface protrusions may be formed by a method of dispersing filler particles of a pre-set size in a starting material (chips) of the non-magnetic support and allowing these particles to be coalesced at a pre-set density so as to be floated on the surface of the non-magnetic support for roughening the non-magnetic support surface. Alternatively, the surface protrusions may be formed by a method of dispersing fine particles of a pre-set particle size on the non-magnetic support and allowing these fine particles to be fixed by a binder resin. The fillers may be particles of $SiO_2$ or a water-soluble latex.

In addition to the above basic constitution of the magnetic recording medium of the present invention, a protective layer may be formed on the magnetic metal thin film surface or a top coating layer formed of lubricants or rust-proofing agents may be provided as in the case of the usual magnetic recording medium for further improving magnetic characteristics.

The protective layer may be formed as a single layer or two or more layers formed of carbon, $CrO_2$, $Al_2O_3$, BN, Co oxides, MgO, $SiO_2$, $Si_3O_4$, $SiN_xSiC$, $SiN_x$—$SiO_2$, $ZrO_2$, $TiO_2$ or TiC.

Preferred lubricants are those having a fluorocarbon, alkylamine or alkylester main skeleton.

If, in a magnetic recording medium comprising a non-magnetic support, a magnetic metal thin film formed on one surface of the non-magnetic support and a back coating layer formed on the opposite surface of the non-magnetic support, the back coating layer is composed of non-magnetic pigment powders containing carbon powders and a binder, the content of the carbon powders based on the total weight of the non-magnetic pigment powders is not less than 20 wt %, the weight ratio of the non-magnetic pigment powders to the binder is 0.5 to 2 and the coating thickness of the back coating layer is not less than 0.2 μm, the surface resistivity of the back coating layer may be suppressed to not higher than $10^6$ ohm/sq, even although the thickness of the back coating layer is diminished, if within a range of not less than 0.2 μm. With the recording medium, the back coating layer of which has a surface resistivity of not higher than $10^6$ ohm/sq, the optimum running performance is displayed, because electrification is less likely to be produced when the recording medium has a sliding contact with the sliding member. Since the back coating layer is reduced in thickness, the recording medium may be correspondingly reduced in thickness.

DETAILED DESCRIPTION OF PREFERRED EMBODIMENTS

Figure 1:
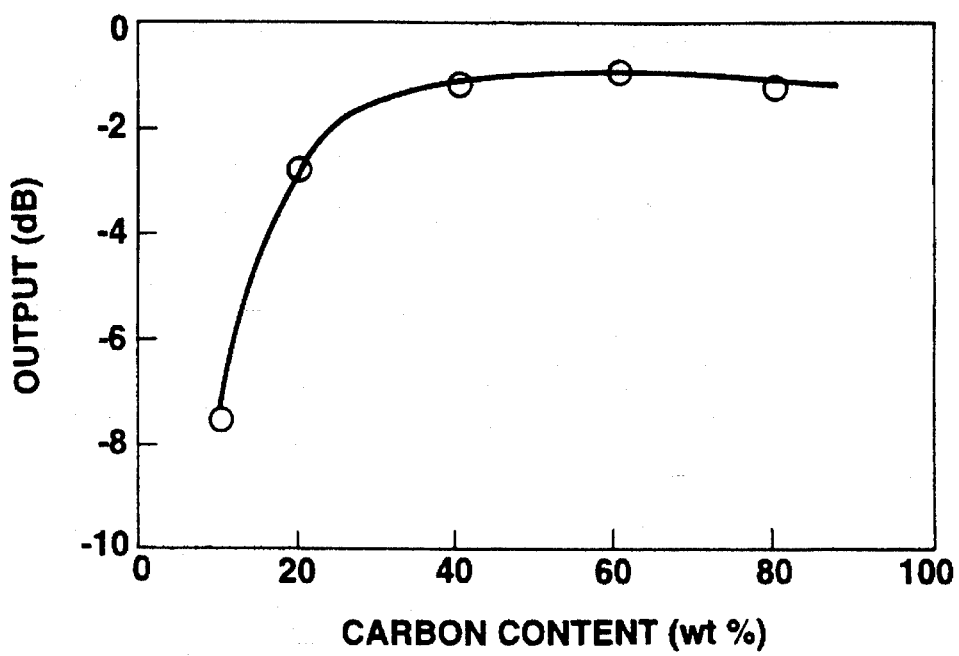
FIG. 1 is a graph showing relations between the content of carbon powders based on the total weight of non-magnetic pigment powders and outputs.

The present invention will be explained with reference to illustrative Examples based on experimental results.

Scrutiny into Carbon Powder Content

A liquid dispersion of particles, prepared by dispersing a water-soluble latex mainly composed of an acrylic acid ester, was dispersed on a polyethylene terephthalate (PTF) film, 6 μm in thickness and 150 mm in width, for forming surface protrusions at a density of $10^9$ per $mm^2$.

On the surface of the PFT film having these surface protrusions was formed a magnetic metal thin film to a film thickness of 200 nm, using a continuous takeup oblique vapor deposition apparatus under the following vapor deposition conditions:

Ingot: Co90-Ni10 where the figures indicate the proportions of the elements in wt %;

incident angle: 45° to 90°;

amount of oxygen introduced: $3.3\times10^{-6} m^3/sec$; and degree of vacuum at the time of vacuum deposition: $7\times10^{-2}$ Pa.

The magnetic properties of the magnetic metal thin film were the coercivity Hc of 1220 Oe and the residual magnetic flux density Br of 4300 G.

The back coating paint was then applied on the opposite surface of the PFT film with respect to the magnetic metal thin film by a gravure system to a coating thickness of 1.0 μm for forming a back coating layer.

The back coating layer was prepared by mixing the carbon as non-magnetic pigment powders, produced by ASAHI CARBON CO. LTD. under the trade name of Carbon Black #60, calcium oxide, titanium oxide, a urethane binder and a solvent, using a device for preparing a mixed paint.

In the non-magnetic pigment powders, the amount of titanium oxide was fixed at 5 wt %, while the proportions of calcium oxide and the carbon were changed. The ratio of the non-magnetic pigment powders to the binder (P/B ratio) was set to 1.0.

Immediately before coating, 5 parts by weight of the curing agent "coronate L-50" were added to the back coating paint prepared as described above.

After formation of the back coating layer as described above, a trimethyl propane solution was applied on the magnetic metal thin film for forming a top coating layer. A magnetic tape was prepared by cutting to a width of 8 mm (Examples 1 to 4 and Comparative Example 1).

A lubricant was employed in which chlorocarbon formed a main skeleton and dimethyl decylamine was used for providing a salt structure.

Of the magnetic tapes, prepared as described above, the surface resistivity, frictional coefficient and surface properties Rz of the back coating layer, shuttle output attenuation and jitter were checked, Meanwhile, the surface resistivity was $4\times10^2$ ohm/sq in each of the various magnetic tapes since these tapes were produced under the same pre-set conditions with respect to the magnetic layer.

The frictional coefficient of the back coating surface was measured by allowing the tapes to run through 100 passes, under application of a load of 30 gf on a stainless steel guide 3 mm in diameter, under an environment of RF of 70% and the temperature of 45° C.

The surface resistivity was measured by a tester, at a dc voltage of 1 kV, with magnetic tape samples each 8 mm in width being set on electrodes spaced apart from each other by a distance of 15 mm, under application of a load of 50 gf from both ends of the tapes. Surface resistivity may also be measured by a method described in IEC 735.

The shuttle running characteristics were checked using a device manufactured and sold by SONY CORPORATION under the trade name of EVS-900 and remodelled for evaluating the shuttle running characteristics. A 30-minute tape, having white-50% recording signals recorded thereon, was run 100 times on the remodelled device at room temperature and output attenuation from the outset was measured for evaluating the shuttle running characteristics.

The jitter was measured with a normal filter using a jitter meter manufactured and sold by MEGURO DENPA SOKKI CO. LTD. under the trade name of MK-812 under an environment of the temperature of 40° C. and RH of 80%.

Figure 2:
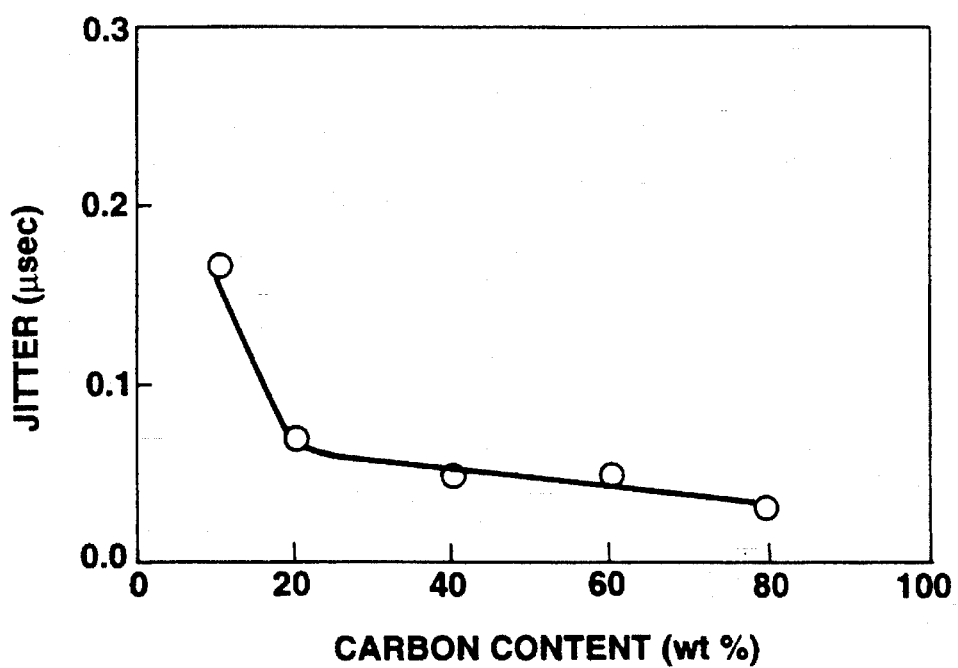
FIG. 2 is a graph showing relations between the content of carbon powders based on the total weight of non-magnetic pigment powders and jitter.
Figure 3:
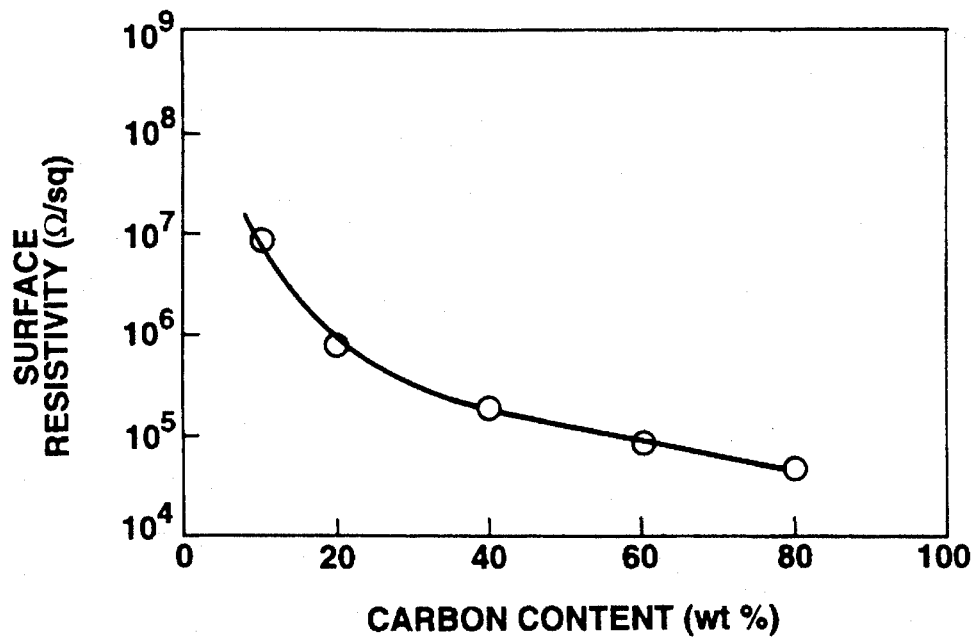
FIG. 3 is a graph showing relations between the content of carbon powders based on the total weight of non-magnetic pigment powders and surface resistivity.

The results are shown in Table 1. The output, jitter and the surface resistivity, plotted against the carbon content based on the total quantity of the non-magnetic pigment powders on the abscissa, are shown in FIGS. 1 to 3, respectively.

TABLE 1

| | Carbon Content (wt %) | Surface Resistivity (Ω/sq) | Frictional Coefficient 1st pass/ 100th pass | Surface Property Rz (nm) | Shuttle Output Attenuation (dB) | Jitter (μsec) |
|---|---|---|---|---|---|---|
| Ex. 1 | 20 | $7.2 \times 10^5$ | 0.21/0.22 | 29 | −2.8 | 0.07 |
| Ex. 2 | 40 | $1.8 \times 10^4$ | 0.22/0.22 | 30 | −1.8 | 0.05 |
| Ex. 3 | 60 | $8.2 \times 10^4$ | 0.22/0.26 | 35 | −1.0 | 0.05 |
| Ex. 4 | 80 | $4.5 \times 10^4$ | 0.24/0.24 | 34 | −1.2 | 0.03 |
| Comp. Ex. 1 | 10 | $8.7 \times 10^6$ | 0.19/0/24 | 31 | −7.5 | 0.17 |

The thickness of the back coating layer and the P/B ratio were set to 1.0 μm and 1.0, respectively.

It is seen from FIG. 1 that the output attenuation is decreased with increase in the carbon amount and becomes constant for the carbon content not lower than 20 wt %.

It is seen from FIG. 2 that the jitter is also decreased with increase in the carbon amount and becomes constant for the carbon content not lower than 20 wt %.

From this it follows that, for improving the running performance and suppressing the output attenuation and the jitter to smaller values, 20 wt % or more of carbon powders need be contained in the non-magnetic pigment powders.

Referring to FIG. 3, a graph showing the relation between the carbon content and the surface resistivity, it is seen that the surface resistivity is decreased with increase in the carbon content. It is the effect of the carbon powders in decreasing the surface resistivity that accounts for the improved running performance of the recording medium. The surface resistivity for the content of the carbon powders not lower than 20 wt % is 10 ohm/sq or lower. That is, the running performance is sufficiently improved by maintaining the surface resistivity to a level not higher than $10^6$ ohm/sq.

Scrutiny into P/B Ratio

In preparing the back coating paint, magnetic tapes were prepared in the same way as described above, except that the weight ratio of the carbon, calcium oxide and titanium oxide as non-magnetic pigment powders was set to 60:35:5, the ratio of the non-magnetic powders to the binder (P/B ratio) was varied and the coating thickness of the back coating layer was set to one of 1.0 μm, 0.5 μm, 0.2 μm and 0.1 μm (Examples 5 to 12 and Comparative Examples 2 to 8).

The surface resistivity, frictional coefficient, surface properties Rz, shuttle output attenuation and the jitter were measured of the above magnetic tapes.

Figure 4:
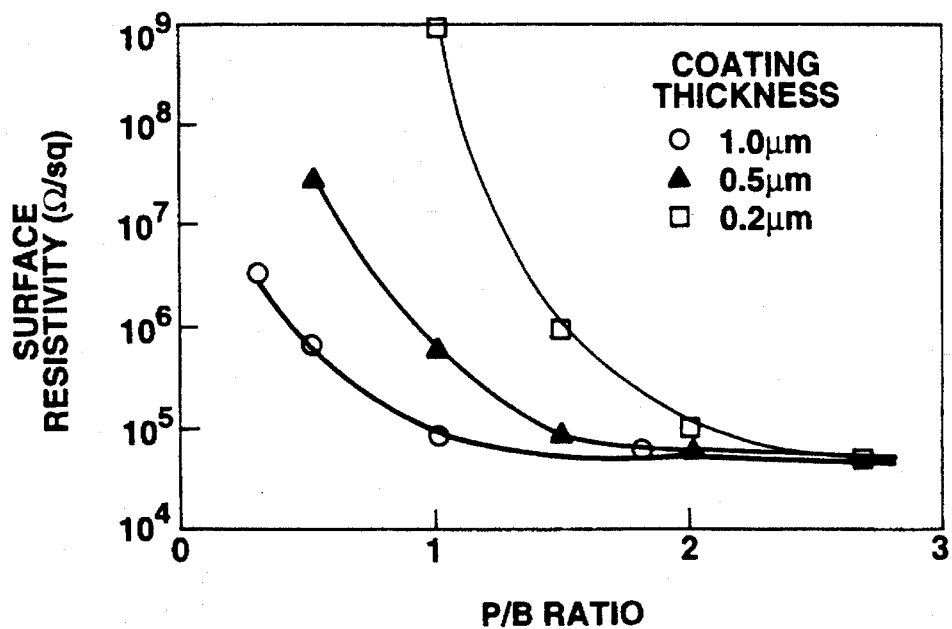
FIG. 4 is a graph showing relations between the P/B ratio and surface resistivity.
Figure 5:
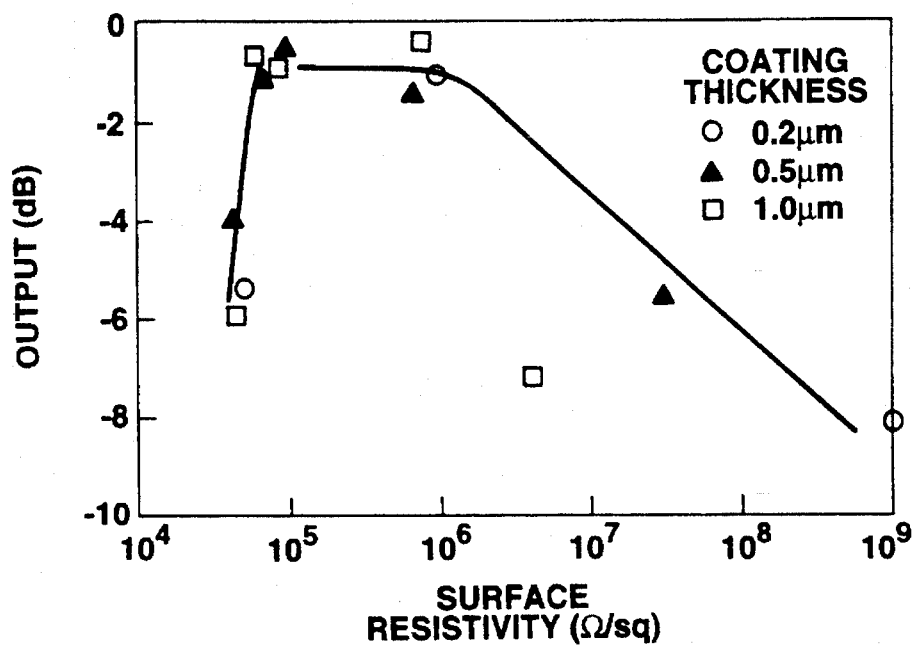
FIG. 5 is a graph showing relations between surface resistivity and outputs.
Figure 6:
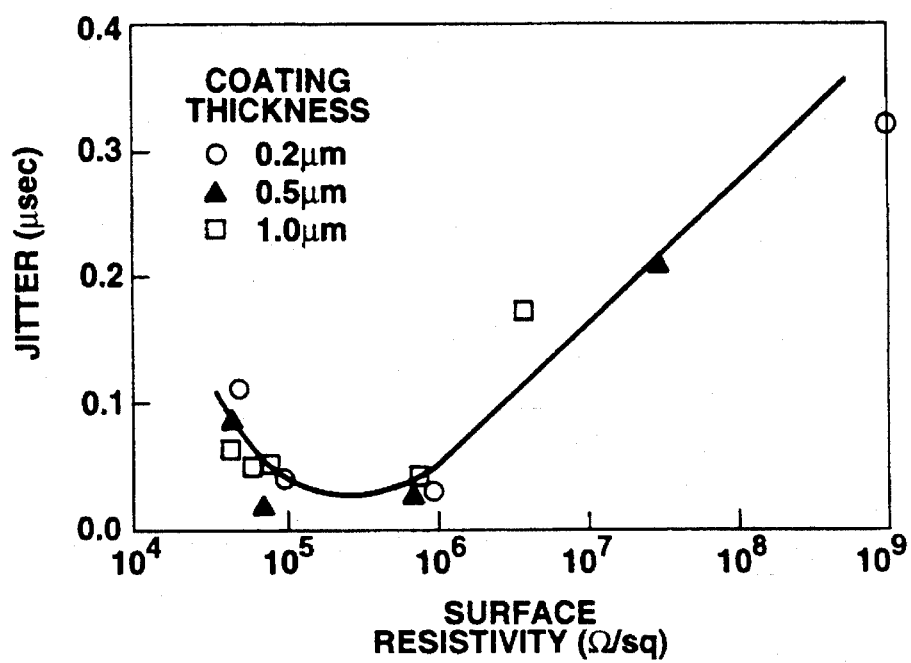
FIG. 6 is a graph showing relations between surface resistivity and jitter.

The results are shown in Tables 2 and 3. The surface resistivity plotted against the P/B ratio on the abscissa is shown in FIG. 4, whereas the output and the jitter, plotted against the surface resistivity on the abscissa, are shown in FIGS. 5 and 8, respectively.

TABLE 2

| | Back Coating Layer Thickness (μm) | P/B Ratio | Surface Resistivity (Ω/sq) | Frictional Coefficient 1st pass/ 100th pass | Surface Property Rz (nm) | Shuttle Output Attenuation (dB) | Jitter (μsec) |
|---|---|---|---|---|---|---|---|
| Ex. 5 | 0.2 | 1.5 | $8.6 \times 10^5$ | 0.19/0.25 | 31 | −1.2 | 0.03 |
| Ex. 6 | 0.2 | 2.0 | $9.2 \times 10^4$ | 0.22/0.26 | 32 | −1.0 | 0.04 |
| Ex. 7 | 0.5 | 1.0 | $6.4 \times 10^5$ | 0.21/0.22 | 30 | −1.5 | 0.03 |
| Ex. 8 | 0.5 | 1.5 | $9.0 \times 10^4$ | 0.22/0.21 | 29 | −0.6 | 0.05 |
| Ex. 9 | 0.5 | 2.0 | $6.7 \times 10^4$ | 0.23/0.25 | 31 | −1.1 | 0.02 |
| Ex. 10 | 1.0 | 0.5 | $7.1 \times 10^5$ | 0.24/0.22 | 35 | −0.5 | 0.04 |
| Ex. 11 | 1.0 | 1.0 | $8.2 \times 10^4$ | 0.22/0.26 | 35 | −1.0 | 0.05 |
| Ex. 12 | 1.0 | 1.8 | $5.9 \times 10^4$ | 0.22/0.22 | 37 | −1.8 | 0.05 |

TABLE 3

| | Back Coating Layer Thickness (μm) | P/B Ratio | Surface Resistivity (Ω/sq) | Frictional Coefficient 1st pass/ 100th pass | Surface Property Rz (nm) | Shuttle Output Attenuation (dB) | Jitter (μsec) |
|---|---|---|---|---|---|---|---|
| Comp. Ex. 2 | 0.1 | 1.0 | Unmeasurable | — | 38 | — | — |
| Comp. | 0.2 | 1.0 | $9.1 \times 10^8$ | 0.21/0.44 | 35 | −8.2 | 0.32 |

TABLE 3-continued

| | Back Coating Layer Thickness (μm) | P/B Ratio | Surface Resistivity (Ω/sq) | Frictional Coefficient 1st pass/ 100th pass | Surface Property Rz (nm) | Shuttle Output Attenuation (dB) | Jitter (μsec) |
|---|---|---|---|---|---|---|---|
| Ex. 3 Comp. Ex. 4 | 0.2 | 2.7 | $4.8 \times 10^4$ | 0.22/0.21 | 31 | −5.4 | 0.11 |
| Comp. Ex. 5 | 0.5 | 0.5 | $2.8 \times 10^7$ | 0.22/0.39 | 25 | −5.5 | 0.21 |
| Comp. Ex. 6 | 0.5 | 2.7 | $4.1 \times 10^4$ | 0.19/0.24 | 37 | −4.0 | 0.09 |
| Comp. Ex. 7 | 1.0 | 0.3 | $3.5 \times 10^6$ | 0.24/0.31 | 33 | −7.2 | 0.17 |
| Comp. Ex. 8 | 1.0 | 2.7 | $4.3 \times 10^4$ | 0.21/0.26 | 28 | −5.9 | 0.06 |

The composition of the non-magnetic pigment powders in the back coating layer is 60 wt % of carbon, 35 wt % of calcium oxide and 5 wt % of titanium oxide.

First, it is seen from FIG. 4 that the lower the P/B ratio in the back coating layer, the larger becomes the surface resistivity.

Above all, such tendency for the surface resistivity to become larger within a range of the lower P/B ratio becomes more pronounced the thinner becomes the film thickness of the back coating layer. The increased surface resistivity for the low P/B ratio is attributable to the decreased content of the carbon powders as the electrically conductive material. On the other hand, acute changes in the surface resistivity within the range of the thin film thickness of the back coating layer are thought to be attributable to the decreased absolute quantity of the carbon particles resulting from the reduced thickness of the back coating layer and the increased tendency for the carbon particles to be separated from one another by interposed binder particles.

Referring to FIGS. 5 and 8, showing the relation between the surface resistivity and the output and the relation between the surface resistivity and the jitter, respectively, both the output attenuation and the jitter become smallest for the range of the surface resistivity of from $5 \times 10^4$ to $10^6$ ohm/sq.

For the range of the surface resistivity exceeding $10^6$ ohm/sq, corresponding to the high P/B ratio, no stable output can be produced for the thin film thickness of, above all, 0.2 μm. Visual inspection of the tape the output of which is unstable reveals a number of chafed portions produced by rubbing contact with the tape guide. If the film thickness is 0.1 μm, the tape running becomes unstable, such that the tape becomes fixed to the guide several times during each pass.

Although the frictional coefficient is not plotted in the drawings, it may be observed that, while no difference attributable to the surface resistivity is noticed within the range of 10 passes, there becomes correlation apparent between the surface resistivity and the frictional coefficient after 100 passes. That is, the larger the surface resistivity, the larger becomes the frictional coefficient.

Such increase in the frictional coefficient, output attenuation and jitter for the surface resistivity exceeding $10^6$ ohm/sq is attributable solely to the surface resistivity, that is to the value of the surface resistivity being larger than an optimum value.

On the other hand, both the output attenuation and the jitter are increased even for the range of the surface resistivity lower than $5 \times 10^4$ ohm/sq, that is for the low P/B ratio). This is thought to be attributable to powder debris from e.g., the back coating layer due to the higher P/B ratio for such range of surface resistivity, as shown in FIG. 4, rather than to surface resistivity.

If FIG. 4 is again referred to with the above taken into account, it is for the P/B ratio in the range of from 0.5 to 2 that the surface resistivity may be set for any values of the film thickness to values of $5 \times 10^4$ to $10^6$ ohm/sq.

It is seen from the above test results that, for suppressing surface resistivity to $10^6$ ohm/sq or less, improving tape running performance and reducing the output attenuation and jitter for the thin film thickness range of the back coating layer, it is desirable for the content of the carbon powders to be 20 wt % or higher based on the total weight of the non-magnetic pigment powders, while it is also desirable for the ratio of the non-magnetic pigment powders to the binder (P/B ratio) to be 0.5 to 2. It is noted that, for reducing the film thickness of the recording medium, the film thickness of the back coating layer is desirably 1.0 μm or less.

What is claimed is:

1. A magnetic recording medium comprising a non-magnetic support, a magnetic metal thin film formed on one surface of the non-magnetic support and a back coating layer formed on the opposite surface of the non-magnetic support, wherein the improvement resides in that the back coating layer is composed of non-magnetic pigment powders containing carbon powders and a binder, the content of the carbon powders based on the total weight of the non-magnetic pigment powders is not less than 20 wt % the weight ratio of the non-magnetic pigment powders to the binder is 0.5 to 2, and the coating thickness of the back coating layer is not less than 0.2 μm, and in that surface resistivity of both the magnetic metal layer and the back coating layer is not higher than $10^6$ Ω/sq.

* * * * *